United States Patent Office 3,404,030
Patented Oct. 1, 1968

3,404,030
METHOD FOR IMPREGNATING POROUS BATTERY SUPPORTS WITH MELTABLE HYDRATED SALTS
Russell E. Palmateer, Emporium, Pa., assignor to Sylvania Electric Products Inc., a corporation of Delaware
No Drawing. Filed Feb. 8, 1965, Ser. No. 431,495
7 Claims. (Cl. 117—169)

ABSTRACT OF THE DISCLOSURE

A process for impregnating porous supports with an electrochemically active compound includes the steps of depositing a meltable hydrated salt onto the porous support, heating the salt and support up to the melting temperature of the salt, surrounding the salt and support with a steam atmosphere, melting the salt, and heating the melted salt to form an anhydrous salt and to decompose the anhydrous salt to a basic salt residue within the pores of the support.

---

This invention relates to a process for impregnating porous supports and more particularly to a process for impregnating porous supports with an electrochemically active compound to provide plaques especially suitable for use in storage batteries.

It is generally conceded that the preparation of plaques or plates suitable for storage batteries is usually carried out in three basic steps: impregnating a porous structure with an electrochemically active compound, converting the compound to hydroxide form, and activating the converted compound to provide electrically active hydroxide within the pores of the support. Moreover, the prior art discloses the various techniques applicable to each of the above-mentioned three basic steps.

Regarding the known prior art, the step of activating the converted compound may be either electrolytic in nature utilizing an aqueous KOH solution or thermal in nature employing heat and a water vapor and ammonia atmosphere as suggested in U.S. Patent 2,880,257 entitled "Alkaline Storage Battery," and issued Mar. 1, 1959. Also, the step of converting the compound to hydroxide form may be carried out by a cathodic process or a thermal process such as suggested in U.S. Patent 3,041,388 entitled, "Method for the Preparation of Plates Suitable for Use in Alkaline Batteries," and issued June 26, 1962. Therein, a combination of heat and an air or steam atmosphere is employed to convert a salt into oxide or hydroxide form.

However, the present invention is not directed to either the step of converting or the step of activating a compound. Rather, this disclosure relates to the step of impregnating the compound within the pores of the porous structure. Thus, the above-mentioned prior art techniques of employing an atmosphere to provide an ion source conducive to either the conversion of the compounds or activation of the converted compounds is inapplicable to the actual impregnation process to be explained hereinafter.

Known processes for impregnating porous structure with electrochemically active compounds may be grouped into three rather general categories. One technique provides for the deposition of a meltable hydrated salt onto a porous structure and the application of heat thereto in air or at a subatmospheric pressure in an amount sufficient to dehydrate and flow the salt into the pores of the support. Another process provides an aqueous salt solution wherein the porous support is either dipped or soaked, either with or without the assistance of a subatmospheric pressure, until the pores are filled with solution. Still another method provides a boiling bath of a salt dissolved in its own water of crystallization wherein a porous support is either dipped or soaked.

Although each of the above-mentioned techniques for impregnating a porous structure with electrochemically active compounds is still utilized to greater or lesser degree, it has been found that the results obtainable therefrom leave much to be desired for any one of a number of reasons. For example, when a hydrated salt is melted in air or a subatmospheric pressure, a major portion of the water or crystallization is evaporated which deleteriously affects the flow properties and thus the uniformity and maximum amount of obtainable impregnation thereof within a porous support. Further, an aqueous salt solution inherently lacks the concentration level of a salt utilizing only its own water of crystallization. Also, a boiling salt bath continuously evaporates the water of crystallization therefrom which is obviously detrimental to the flow properties thereof and thus to the distribution and maximum amount of impregnation obtainable.

Therefore, it is an object of the invention to provide an enhanced process for impregnating porous supports with electrochemically active compounds.

A further object of the invention is to provide an improved process for fabricating electrodes suitable for use in alkaline storage batteries.

A still further object of the invention is to improve the impregnation of porous supports with electrochemically active compounds by a process wherein the compounds in the molten state are characterized by improved flow and improved concentration properties.

Another object of the invention is to provide an economical and efficient process for obtaining a maximum impregnation of electrochemically active materials within a porous support suitable for use in an alkaline storage battery.

These and other objects are achieved in one aspect of the invention by surrounding a meltable hydrated salt upheld by a porous support with a steam atmosphere, melting the salt at a controlled rate, and heating the melted salt to form an anhydrous salt and to decompose the anhydrous salt to a basic salt residue substantially filling each of the pores of the support.

For a better understanding of the present invention, together with other and further objects, advantages, and capabilities thereof, reference is made to the following disclosure and appended claims.

Although the process may be utilized in other applications, it has been found particularly applicable to the manufacture of plaques which, after further processing, are suitable for use in storage batteries and particularly alkaline storage batteries of the rechargeable type.

Accordingly, a porous support is selected which may be, for example, any of the well-known and readily available nickel supports commonly used for plaques in storage batteries. Obviously, other materials such as graphite and various alloyed nickel materials are equally applicable as supports so long as the melting temperature thereof is higher than the melting and decomposition temperatures of the electrochemically active materials to be impregnated therein. Also the selected support, as do most available supports used for storage battery fabrication, has a porosity in the range of about 80–85%.

Onto the selected support is deposited a quantity of a meltable hydrated salt. Any number of such salts are available and such inorganic acid salts as nitrates, chlorides, and sulfates will serve as examples. Also, salts selected from the metal group consisting of nickel, cadmium, silver, zinc, and aluminum are typical of materials especially applicable to the storage battery art as well as to the present process.

The support and the meltable hydrated salt are then heated up to, but not in excess of, the melting temperature of the salt. In this manner, the salt and particularly the support may be introduced into a steam atmosphere without fear of acquiring an undesired quantity of water by way of condensation of the steam thereon. Obviously, the above-mentioned melting temperature is dependent upon the salt as well as the surrounding pressure thereon. Thus, for economy as well as convenience, the salt and support are preferably heated at ambient room pressure.

Then, the heated support and meltable hydrated salt are surrounded by a steam atmosphere. Thus, the above-mentioned prior heating of the salt and support permits the introduction thereof into the steam atmosphere without the formation of undesired water by way of condensation of the steam. In other words, the hydrated salt, the support, and the steam atmosphere are substantially in a state of chemical equilibrium.

Again, it is obvious that any one of a number of well-known methods may be utilized to provide the above-described condition. For example, the support and the hydrated salt can be placed in a chamber at ambient pressure, heated above the condensation temperature of the steam but below the melting temperature of the salt, and a steam atmosphere flowed into the chamber. Alternately, the pressures and the temperatures of the support, hydrated salt, and steam atmosphere may be either raised or lowered so long as the above-described chemical equilibrium condition is provided.

Following, heat is applied to the hydrated salt and steam atmosphere at a rate and in an amount sufficient to melt the hydrated salt, i.e., dissolve the salt in its own water of crystallization and disturb the equilibrium between the salt and atmosphere such that melted salt attains a viscosity which permits the flow and uniform distribution thereof in each of the pores of the support. Thus, the steam atmosphere not only prevents evaporation of the water of crystallization from the melted salt, due to the applied heat which would deleteriously affect the flow properties thereof, but also provides only sufficient additional water from the atmosphere to permit the uniform distribution of the melted salt throughout all of the pores of the support structure.

When the heat is applied at too rapid a rate, an excess amount of water from the steam atmosphere is added to the melted salt whereby the melted salt is diluted and viscosity thereof is lowered causing the melted salt to drip from the support. Obviously, when the melted salt drips from the support, it is wasted in so far as impregnation of the support is concerned. On the other hand, when heat is applied at too slow a rate or at too low a temperature, the hydrated salt is either not completely melted or, if melted, is too viscous to flow and uniformly fill, or partially fill, each of the pores of the support. Preferably, the salt is heated at ambient pressure to a temperature in the range of about 75° to 125° C. and at a rate such that the melted salt has a viscosity which permits uniform distribution thereof in each of the pores of the support but does not allow the removal thereof from the support by dripping.

Then, heat is applied to the melted salt in an amount and at a temperature sufficient to dehydrate the melted salt to an anhydrous salt and to decompose the anhydrous salt to gaseous oxides of nitrogen and a basic salt residue. The residue substantially and uniformly filling, at least partially, all of the pores of the plaque. Preferably, the heat is applied at ambient pressure and a temperature in the range of about 125° to 200° C. whereupon a residue of basic salt in the range of about 40 to 60% by weight of the original hydrated salt is provided. When a temperature greater than about 200° C. is utilized to provide a residue greater than about 60% by weight of the original hydrated salt, it has been found that the formation of a metal oxide such as nickel oxide occurs. Unfortunately, metal oxides cannot be activated to provide the desired and necessary electrochemically active materials required within the pores of the support. When a temperature less than about 125° C. is utilized to provide a residue less than about 40% by weight of the original hydrated salt, the maximum amount of chemically active material impregnation is not obtained.

Thereafter, the above-described process may be repeated to provide plaques of increased capacity. More specifically, the water-saturated atmosphere surrounding the support is removed, an additional quantity of meltable hydrated salt is deposited on the support, the salt and support are heated up to the melting temperature of the salt, and the salt and structure are surrounded by a steam atmosphere with the process continuing as previously described. Preferably, the support is rotated and the meltable hydrated salt deposited on opposite surfaces thereof to enhance the uniformity of the active material impregnation within the porous support. Then the support is removed from the steam atmosphere and subsequently processed in a well-known manner to convert the basic salt residue to highly activated hydroxide form and provide a battery plaque.

As a specific example of the process, hydrated nickel nitrate was deposited on the surface of a porous nickel support having a porosity of about 85%. The nickel nitrate and the support were disposed in a container and heated in air at ambient pressure to a temperature of about 60° C. Steam was introduced into the container and surrounded the nitrate and the support.

The temperature of the hydrated nickel nitrate and steam atmosphere at ambient pressure was raised to about 100° C. by means of a heat lamp external to the container whereupon nickel nitrate in the molten state flowed and substantially uniformly filled all of the pores of the support. Then the temperature of the melted nickel nitrate was gradually raised to about 165° C. whereupon the melted nickel nitrate was dehydrated and decomposed to provide gaseous nitrogen oxides and a basic nickel nitrate residue within each of the pores of the support.

The basic nickel nitrate residue was about 50% by weight of the original hydrated salt and the above process was repeated six times, three times on each support surface, to obtain the desired capacity. Then, the plaque was withdrawn from the steam atmosphere and, in combination with a plaque of opposite polarity, activated in an aqueous potassium hydroxide solution in a manner well known in the battery art.

The entire above-discussed impregnation process, including six cycles, was carried out in a one-hour period and provided an electrode having a capability and capacity equal to prior cathodically polarized electrodes which also required six cycles with each cycle requiring in the neighborhood of about 5 hours. The plaques impregnated in the above manner have exhibited an improved uniformity of active material distribution and the process has not only increased the efficiency and reduced the fabricating cost but also provided an enhanced product.

While there has been shown and described what is at present considered to be the preferred embodiment of the invention, it will be obvious to those skilled in the art that various changes and modifications may be made therein without departing from the invention as defined by the appended claims.

What is claimed is:

1. A process for impregnating a porous support comprising the steps of:

depositing a meltable hydrated salt onto a porous support;

heating said salt and support up to the melting temperature of said salt;

surrounding said heated salt and support with a steam atmosphere;

melting said salt at a rate sufficient to substantially uniformly fill each of the pores of said support with melted salt; and heating said melted salt to form an anhydrous salt and to decompose said anhydrous salt to a residue of basic salt, said residue at least partially filling each of the pores of said support.

2. A process for impregnating a porous support with an electrochemically active compound comprising the steps of:

depositing a quantity of a meltable hydrated salt onto a porous support, said salt being selected from the inorganic acid salt group consisting of nitrates, chlorides, and sulfates;

heating said salt and support up to the melting temperature of said salt;

surrounding said heated salt and support with a steam atmosphere;

melting said salt at a rate sufficient to substantially uniformly fill the pores of said support with melted salt; and heating said melted salt to form an anhydrous salt and to decompose said anhydrous salt to a residue of basic salt, said residue substantially and at least partially filling each of the pores of said support.

3. A process for impregnating porous supports with an electrochemically active compound to provide plaques suitable for use in storage battery comprising the steps of:

depositing a quantity of a meltable hydrated salt onto a porous support, said salt being selected from the metal group consisting of nickel, cadmium, silver, zinc, and aluminum;

heating the salt and support up to the melting temperature of said salt;

surrounding said heated salt and support with a steam atmosphere, said salt and said atmosphere being in a state of equilibrium;

melting said salt and disturbing said atmosphere at a rate and in an amount sufficient to substantially uniformly fill each of the pores of said support with melted salt; and heating said melted salt to form an anhydrous salt and to decompose said anhydrous salt to a residue of basic salt, said residue uniformly and at least partially filling each of the pores of said support.

4. A process for impregnating porous supports with an electrochemically active compound to provide plaques suitable for use in storage battery comprising the steps of:

depositing a meltable hydrated salt onto a porous nickel support;

heating said salt and support up to the melting temperature of said salt;

surrounding said heated salt and support with a steam atmosphere;

melting said salt at a rate and in an amount sufficient to substantially uniformly fill each of the pores of said support with melted salt; and heating said melted salt to a temperature to form an anhydrous salt and to decompose said anhydrous salt to a basic salt residue, said residue being in the range of about 40 to 60% by weight of said meltable hydrated salt and said temperture being lower than the metal oxide formation temperature of said residue.

5. A process for impregnating porous supports with an electrochemically active compound to provide plaques suitable for use in a storage battery comprising the steps of:

depositing a meltable hydrated salt onto a porous nickel support;

heating said salt and support above the condensation temperature of steam and below the melting temperature of said salt;

surrounding said salt and support with a steam atmosphere at ambient pressure;

heating said hydrated salt to a temperature in the range of about 75° to 125° C. at a rate sufficient to substantially uniformly fill each of the pores of said support with melted salt; and heating said melted salt at ambient pressure to a temperature in the range of about 125° to 200° C. to form an anhydrous salt and to decompose said anhydrous salt to a basic salt residue substantially covering the surface and at least partially filling the pores of said support.

6. A process for impregnating porous supports with an electrochemically active compound to provide plaques suitable for use in a storage battery comprising the steps of:

depositing a meltable hydrated salt onto a porous nickel support;

heating said salt and support at ambient pressure to a temperature above the condensation temperature of steam and below the melting temperature of said salt;

surrounding said salt and support with a steam atmosphere, said salt and atmosphere having an ambient pressure and at a temperature sufficient to provide a state of equilibrium therebetween;

heating said hydrated salt and temperature to a temperature in the range of about 75° to 125° C. to cause said salt to melt and said equilibrium to be disturbed in an amount and at a rate sufficient to uniformly flow said melted salt into each of the pores of said support;

heating said melted salt at ambient pressure to a temperature in the range of about 125° to 200° C. to form an anhydrous salt and to decompose said anhydrous salt to a basic salt residue substantially uniformly at least partially filling each of the pores of said support; and repeating the above steps to obtain the desired amount of basic salt residue within the pores of said support.

7. A process for impregnating porous supports with an electrochemically active compound to provide plaques suitable for use in a storage battery comprising the steps of:

depositing hydrated nickel nitrate onto a porous nickel support;

heating said nitrate and support at ambient pressure above the condensation temperature of steam and below the melting temperature of the nitrate;

surrounding said nitrate and support with a steam atmosphere;

heating said hydrated nickel nitrate at ambient pressure to a temperature in the range of about 75° to 125° C. at a rate suffiicent to provide a melted nickel nitrate substantially uniformly filling each of the pores of said nickel support;

heating said melted nickel nitrate at ambient pressure to a temperature in the range of about 125° to 200° C. to form anhydrous nickel nitrate and to decompose said anhydrous nickel nitrate to oxides of nitrogen and a basic nickel nitrate residue, said residue being in the range of about 40 to 60% by weight of said hydrated nickel nitrate and said temperature being lower than the temperature of nickel oxide formation; and repeating the above steps about six times to obtain the desired amount of basic nickel nitrate residue substantially uniformly filling the pores of said nickel support.

References Cited

UNITED STATES PATENTS

| | | | |
|---|---|---|---|
| 2,946,699 | 7/1960 | San et al. | 117—169 |
| 3,269,864 | 8/1966 | Ackermann et al. | 136—73 X |
| 3,281,272 | 10/1966 | Ackermann et al. | 136—67 X |

ALFRED L. LEAVITT, *Primary Examiner.*

H. COHEN, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,404,030                                  October 1, 1968

Russell E. Palmateer

It is certified that error appears in the above identified patent and that said Letters Patent are hereby corrected as shown below:

Column 6, line 22, "temperature" should read -- atmosphere --.

Signed and sealed this 17th day of February 1970.

(SEAL)
Attest:

Edward M. Fletcher, Jr.                       WILLIAM E. SCHUYLER, JR.
Attesting Officer                                  Commissioner of Patents